(12) United States Patent
Lee

(10) Patent No.: US 6,356,139 B1
(45) Date of Patent: Mar. 12, 2002

(54) REFERENCE VOLTAGE GENERATOR

(75) Inventor: Seop Lee, Kyoungki-do (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/603,279

(22) Filed: Jun. 26, 2000

(30) Foreign Application Priority Data

Jun. 29, 1999 (KR) ............................................. 99-25369

(51) Int. Cl.[7] ................................................ G05F 1/10
(52) U.S. Cl. ......................... 327/537; 327/553; 327/525
(58) Field of Search .................................. 327/530, 535, 327/537, 538, 540–546, 551–553, 525; 323/313, 314

(56) References Cited

U.S. PATENT DOCUMENTS

| | | | | |
|---|---|---|---|---|
| 4,100,437 A | * | 7/1978 | Hoff, Jr. ...................... | 327/543 |
| 4,978,905 A | * | 12/1990 | Hoff et al. ................... | 323/314 |
| 5,283,762 A | * | 2/1994 | Fujishima ............... | 365/189.09 |
| 5,559,424 A | * | 9/1996 | Wrathall et al. ............. | 323/277 |
| 5,694,076 A | * | 12/1997 | Ishibashi ..................... | 327/541 |
| 5,818,212 A | * | 10/1998 | Min et al. .................... | 323/314 |
| 5,838,076 A | * | 11/1998 | Zarrabian et al. ........... | 307/115 |
| 6,091,282 A | * | 7/2000 | Kim ............................ | 327/536 |
| 6,147,479 A | * | 11/2000 | Lee ............................. | 323/313 |

* cited by examiner

Primary Examiner—Timothy P. Callahan
Assistant Examiner—Hai L. Nguyen
(74) Attorney, Agent, or Firm—Pillsbury Winthrop LLP Intellectual Property Group

(57) ABSTRACT

A reference voltage generator, comprising: reference voltage generation means for generating a reference voltage having a potential level through an output node by a power-up signal; noise removing means for a noise which is caused in a ground terminal and is provided to the output node; and reference voltage level adjusting means being connected between the output node of the reference voltage generation means and the ground terminal and for adjusting the potential level of the reference voltage from the reference voltage generation means.

8 Claims, 6 Drawing Sheets

REFERENCE VOLTAGE GENERATOR

BACKGROUND OF THE INVENTION

1. Field of the Invention

This invention relates to a reference voltage generator, and more particularly to a reference voltage generator for removing the noise being applied through a ground voltage and adjusting the potential level of the reference voltage.

2. Description of the Related Art

FIG. 1 shows a circuit diagram of a reference voltage generator. The prior reference voltage generator 10 includes PMOS transistors P1 and P2 which are respectively connected between a power supply terminal Vcc and nodes Nd1 and Nd2 and their gates are commonly connected to the node Nd2, NMOS transistors N1 and N2 which are respectively connected between the nodes Nd1 and Nd2 and a ground terminal Vss and their gates are commonly connected to the node Nd1, and a resistor R1 connected between the node Nd2 and the ground terminal Vss.

The prior reference voltage generator 10 includes a PMOS transistor P3 and a NMOS transistor N3 which are respectively connected between the power supply terminal Vcc and the node Nd3 and between the ground terminal Vss and a node Nd3 and a power-up signal PWRUP is commonly supplied to gates thereof and a NMOS transistor N4 which is connected between the node Nd2 and the ground terminal Vss and its gate is connected to the node Nd3, a NMOS transistor N5 for a capacitor which is connected between the node N2 and the ground terminal Vss.

The prior reference voltage generator 10 further includes a PMOS transistor P4 which is connected between the power supply terminal Vcc and an output node VREF for reference voltage and its gate is connected to the node Nd2 and a PMOS transistor P5 for a diode which is connected between the output node VREF and the ground terminal Vss.

The prior reference voltage generator uses Widlar source reference voltage generator.

The operation of the prior reference voltage generator will be described as follows. If the power-up signal PWRUP of low state is received, the PMOS transistor P3 turns on and the potential of the node Nd3 becomes in a high state. The NMOS transistor N4 turns on by the high state potential of the node Nd3 and the potential of the node Nd2 becomes in a low state. The PMOS transistors P1 and P2 of current mirror structure turn on by the low state potential of the node Nd2 to provide the power supply Vcc to the nodes Nd1 and Nd2, respectively. The NMOS transistors N1 and N2 of current mirror structure turn on by the power supply Vcc at the node Nd1 to drain the potential of the nodes Nd1 and Nd2 to the ground terminal Vss, respectively.

The potential of the node Nd2 is higher than that of the node Nd1 by the resistor R1 connected between the NMOS transistor N2 and the ground terminal Vss. But, because the potential of the node Nd2 is drained to the ground terminal Vss through the NMOS transistor N4, the node Nd2 becomes in a low state. Accordingly, the PMOS transistor P4 which receives the potential of the node Nd2 as an input of its gate turns on and the power supply Vcc is provided to the output node VREF as the reference voltage. The PMOS transistor P5 also turns on by the potential of the output node VREF. Accordingly, the power supply voltage Vcc is voltage-divided by the PMOS transistors P4 and P5 connected between the power supply terminal Vcc and the ground terminal Vss and the divided voltage is provided to the output node as the voltage reference VREF.

In the above prior reference voltage generator, when a chip operates, the noise caused in the ground terminal is transferred to the output node for reference voltage VREF as it is as the simulation result shown in FIG. 2. It is apt to cause the malfunction when the data signal having a TTL level is compared with the reference VREF. Besides, there is no solution after metal revision, in case where the level of the reference voltage VREF is shifted by the process variation.

SUMMARY OF THE INVENTION

It is an object of the present invention to provide a reference voltage generator for removing the noise caused in the ground terminal using a low pass filter and for adjusting the potential level of the reference voltage.

According to an aspect of the present invention, there is provided to a reference voltage generator, comprising: reference voltage generation means for generating a reference voltage having a potential level through an output node by a power-up signal; noise removing means for a noise which is caused in a ground terminal and is provided to the output node; and reference voltage level adjusting means being connected between the output node of the reference voltage generation means and the ground terminal and for adjusting the potential level of the reference voltage from the reference voltage generation means using plural metal options and fuse options.

In the reference voltage generator, the noise removing means includes a capacitor and a resistor. The capacitor is comprised of a MOS transistor, for example NMOS transistor.

In the reference voltage generator, the reference voltage level adjusting means includes: a first fuse decoder for generating first and second output signals decoded in accordance with a cutting state of a first fuse; a second fuse decoder for generating third and fourth output signals decoded in accordance with a cutting state of a second fuse; a fuse multiplexor for receiving the first to the fourth output signals from the first and second fuse decoders to generate a first to a fourth control signals; voltage adjusting means including a first switching stage being switched by the first to fourth control signals from the fuse multiplexor and being connected to metal options; a second switching stage being switched by the first to fourth control signals from the fuse multiplexor and being connected to metal options and a third switching stage being switched by the first to the fourth control signals; and selective logic means for selectively controlling the third switching stage by the first to the fourth control signals.

In the reference voltage generator, each of the first fuse decoder and the second fuse decoder includes; a first or second fuse connected between a power supply terminal and a first node; a first NMOS transistor for a capacitor connected between the first node and the ground terminal; a second NMOS transistor which is connected between the first node and the ground terminal and its gate is connected to a second node; a first inverter including a first PMOS transistor and a third NMOS transistor which are connected between the power supply terminal and the ground terminal and their gates are commonly connected to the first node; a second inverter including a second PMOS transistor and a fourth NMOS transistor which are connected between the power supply terminal and the ground terminal and their gates are commonly connected to the second node and providing a second or fourth output signal through a third node; a third inverter including a third PMOS transistor and a fifth NMOS transistor which are connected between the power supply terminal and the ground terminal and their gates are commonly connected to the third node and their gates are connected to the third node and providing a first or third output signal.

In the reference voltage generator, the fuse multiplexor includes: a first NAND gate for receiving the first output signal from the first fuse decoder and the third output signal from the second fuse decoder to generate the first control signal; a second NAND gate for receiving the second output signal from the first fuse decoder and the third output signal from the second fuse decoder to generate the second control signal; a third NAND gate for receiving the first output signal from the first fuse decoder and the fourth output signal from the second fuse decoder to generate the third control signal; a fourth NAND gate for receiving the second output signal from the first fuse decoder and the fourth output signal from the second fuse decoder to generate the fourth control signal.

In the reference voltage generator, the first switching stage is comprised of at least one PMOS transistor or more which are connected by the metal options. The second switching stage is comprised of at least one PMOS transistor or more which are connected by the metal options. The third switching stage is comprised of at least one PMOS transistor or more.

In the reference voltage generator, the selective logic means includes: a logic gate for receiving the first and fourth control signal; a first NMOS transistor which the second control signal is provided to its gate; a second NMOS transistor which the third control signal is provided to its gate; a third NMOS transistor which an output signal of the logic gate is provided to its gate, wherein the third switching stage is selectively controlled by the first to third NMOS transistors.

BRIEF DESCRIPTION OF THE DRAWINGS

The objects and features of the invention may be understood with reference to the following detailed description of an illustrative embodiment of the invention, taken together with the accompanying drawings in which.

DETAILED DESCRIPTION OF THE INVENTION

Figure 3:
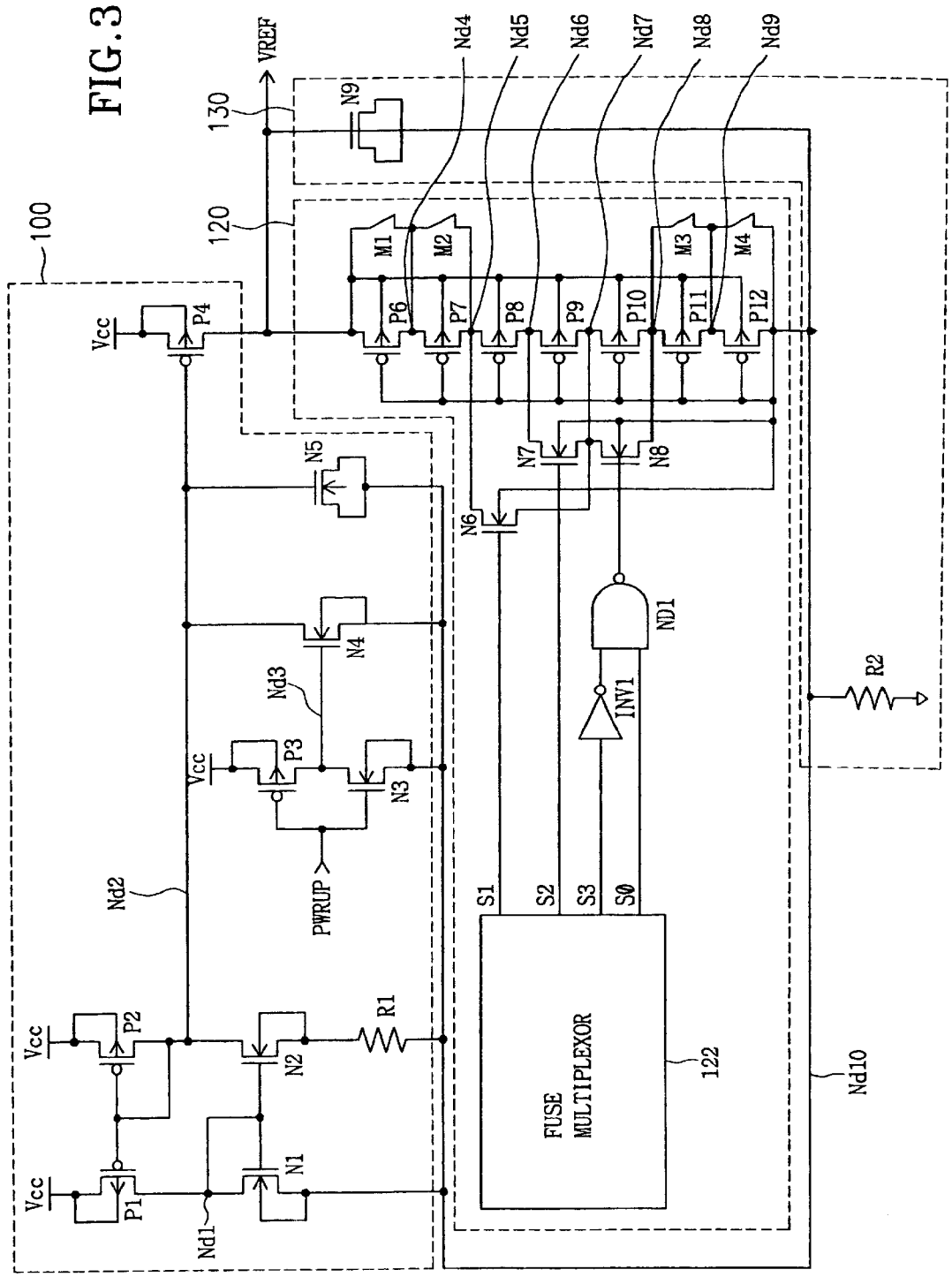
FIG. 3 is a circuit diagram of a reference voltage generator in accordance with an embodiment of the present invention.

FIG. 3 is a circuit diagram of a reference voltage generator in accordance with an embodiment of the present invention. The reference voltage generator includes a reference voltage generation part 100 for generating a reference voltage VREF having a selected potential level through an output node by a power-up signal; a reference voltage level adjusting part 120 for adjusting the potential level of the reference voltage from the reference voltage generation part 100 using plural metal options and plural fuse options; and a noise removing part 130 for removing a noise which is provided to the reference voltage of the output node VREF through the ground terminal of the reference voltage generation part 100.

Figure 1:
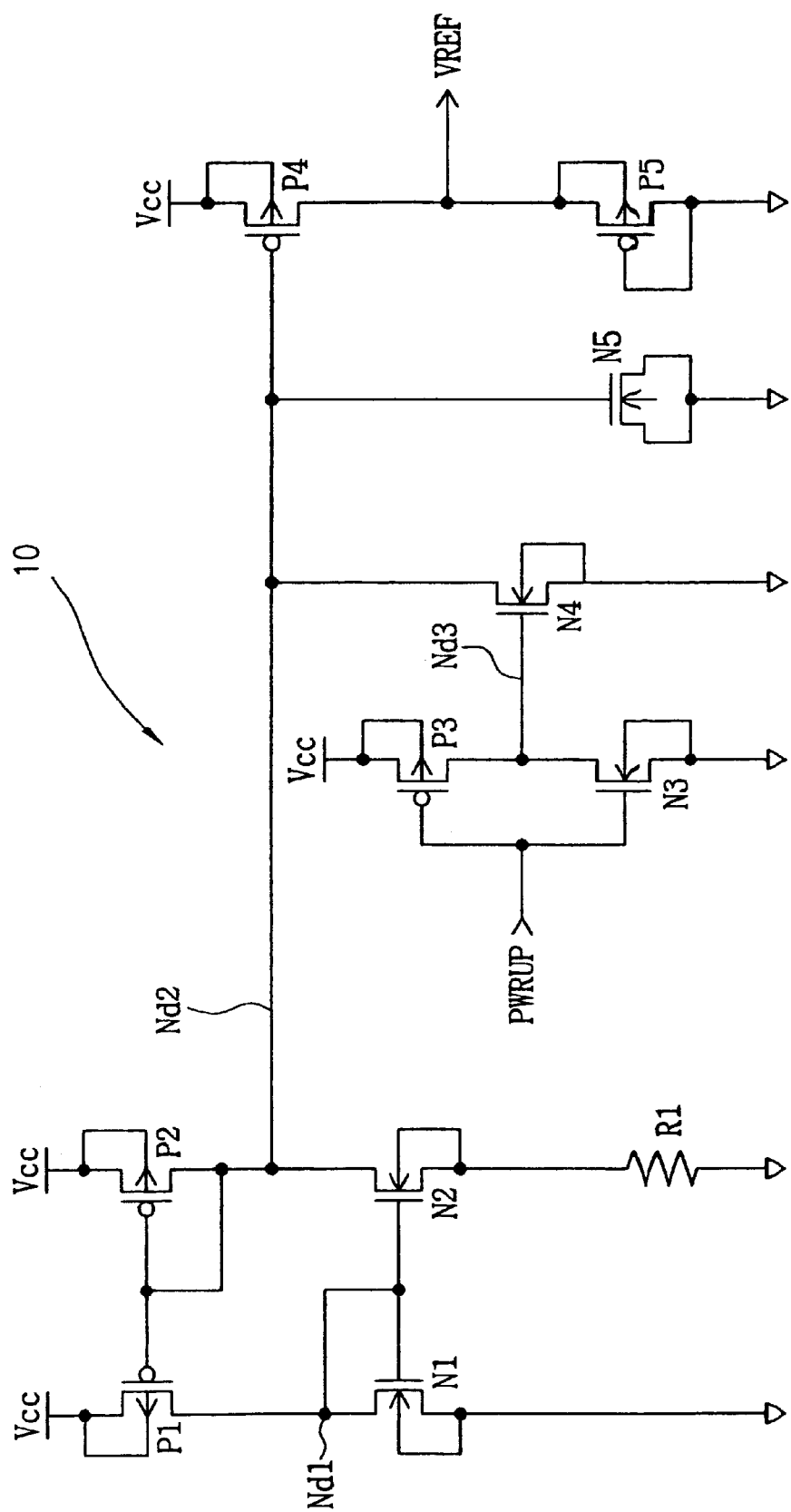
FIG. 1 is a circuit diagram of a reference voltage generator in the prior art.
Figure 2:
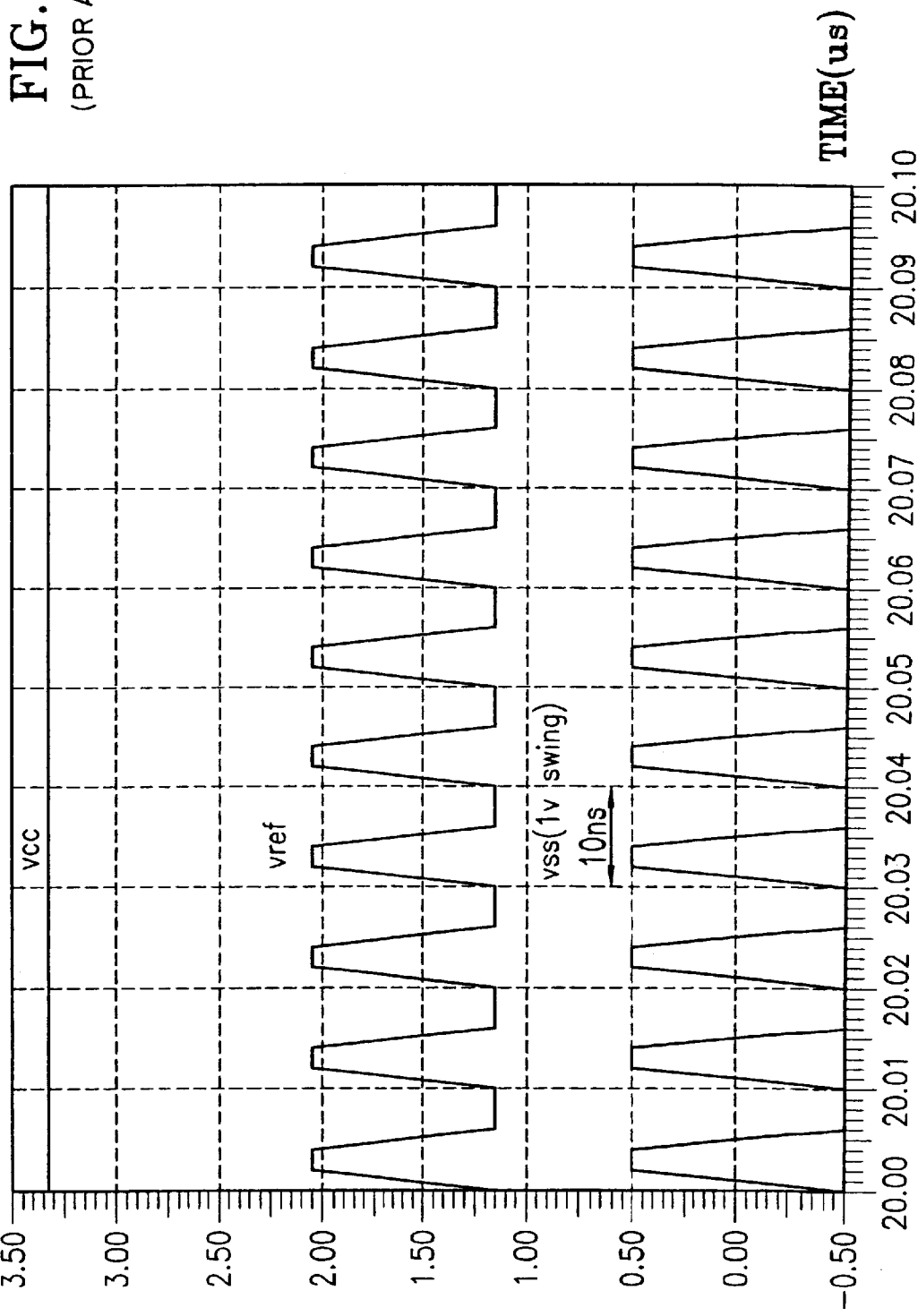
FIG. 2 is a simulation of the noise in the prior reference voltage generator.

The reference voltage generation part 100 of FIG. 3 has the similar construction as the reference voltage generation part 10 of FIG. 1. In an embodiment of the present invention, the ground terminals Vss of the reference voltage generator 100 are commonly connected to the noise removing part 130 through a node Nd10. The reference voltage level adjusting part 120 is connected between the output node VREF for reference voltage and the node Nd10 which the noise removing part 130 instead of the PMOS transistor P5 connected between the output node VREF for reference voltage and the ground terminal Vss in FIG. 2.

The reference voltage generation part 100, as described above, compares and amplifying the potentials of the nodes Nd1 and Nd2 to generate the reference voltage VREF. The potential of the node Nd1 is determined by the power-up signal PWRUP. If the power-up signal is in a low state, the PMOS transistor P3 turns on and the potential of the node Nd3 becomes high. Accordingly, the NMOS transistor N4 turns on and the potential of the node Nd2 becomes low. On the contrary, if the power-up signal is in a high state, the NMOS transistor N3 turns on and the potential of the node Nd3 becomes low. Accordingly, the NMOS transistor N4 turns off and the potential of the node Nd2 becomes high. The PMOS transistor P4 turns on by the potential of the node Nd2 to supply the power voltage Vcc to the output node VREF for reference.

The noise removing part 130 includes a low pass filter for removing the noise caused through the ground terminal Vss. The low pass filter includes a resistor R2 connected between the node Nd10 where a ground voltage is applied in the reference voltage generation part 100 and the ground terminal Vss and a NMOS transistor for a capacitor connected between the output node VREF and the node Nd10.

The operation principles of the noise removing part 130 having the above construction will be described in brief as follows.

First, a differential equation of a circuit, which is the noise removing part 130, is expressed with the following equation (1) from the Kirchhoff's law.

$$V = Ri + Q/C \qquad (1)$$

If it differentiates the equation (1) to a time t, $$di/dt + i/RC = 0 \qquad (2)$$

So as to solve the differential equation, the equation (2) will be expressed by the following equation (3).

$$di/i = -1/RC\, dt \qquad (3)$$

The right side and the left side of the equation (3) are normal integral type and if it integrates the equation (3), $$Ini = -1/RCt + K \qquad (4)$$

Herein, K is a constant that is calculated from the initial conditions. The equation (4) may be expressed by the following equation (5).

$$i = \text{ext}\,((-t/RC) + K) = A\exp(-t/RC),\ A = \exp K \qquad (5)$$

So as to calculate A, at t=0, the initial voltage at the capacitor N9 is 0, so that the current is equal to V/R. Accordingly, $$i=(V/R)\exp(-t/RC) \quad (6)$$

The voltage of the capacitor N9 at a certain time is equal to the voltage that the total voltage subtracts the voltage of the resistor R2. That is, $$Vc=V-Ri=V(1-\exp(-t/RC)) \quad (7)$$

From the above equation (7), if the noise having a swing width of 1V, i.e. ±0.5V at a frequency of 100 MHz is applied to the output node VREF for reference voltage from the ground voltage Vss and the capacitance of the capacitor N9 is 6 pF, the voltage Vc of the capacitor N9 becomes about 0.15V.

Accordingly, the reference voltage generator of the present invention can interrupt the noise from the ground voltage Vss using the RC filter.

The reference voltage level adjusting part 120 includes a fuse multiplexor 122 generating a first to a fourth decoded control signals S0–S3, an inverter INV1 for inverting the fourth control signal S3 from the fuse multiplexor 122 and a NAND gate ND1 for receiving the first control signal S0 from the fuse multiplexor 122 and an output signal of the inverter INV1.

The reference voltage level adjusting part 120 further includes a PMOS transistor P6 which is connected between the output node VREF of the reference voltage generation part 110 and a node Nd4 and the second control signal S1 is applied to its gate; a PMOS transistor P7 which is connected between the node Nd4 and a node Nd5 and the second control signal S1 is applied to its gate; a PMOS transistor P8 which is connected between the node Nd5 and a node Nd6 and the second control signal S1 is applied to its gate; a PMOS transistor P9 which is connected between the node Nd6 and a node Nd7 and the second control signal S1 is applied to its gate; a PMOS transistor P10 which is connected between the node Nd7 and a node Nd8 and the second control signal S1 is applied to its gate; a PMOS transistor P11 which is connected between the node Nd8 and a node Nd9 and the second control signal S1 is applied to its gate; and a PMOS transistor P12 which is connected between the node Nd9 and the node Nd10 and the second control signal S1 is applied to its gate.

The reference voltage level adjusting part 120 further includes a metal option M1 connected between the output node VREF of the reference voltage generation part 100 and the node Nd4, a metal option M2 connected between the nodes Nd4 and Nd5, a metal option M3 connected between the nodes Nd8 and Nd9 and a metal option M4 connected between the nodes Nd9 and Nd10.

The reference voltage level adjusting part 120 further includes a NMOS transistor N6 which is connected between the nodes Nd5 and Nd7 and the second control signal S1 is applied to its gate; a NMOS transistor N7 which is connected between the nodes Nd6 and Nd7 and the third control signal is applied to its gate; and a NMOS transistor N8 which is connected between the nodes Nd7 and Nd8 and an output signal of the NAND gate ND1 is applied to its gate.

As shown in FIG. 3, the PMOS transistors P6 and P7 are connected through the metal options M1 and M2 and the PMOS transistors P11 and P12 are connected through the metal options M3 and M4. At this time, if the metal options M1 and M2 are cut, the level of the reference voltage VREF at the output node drops. While the metal options M3 and M4 are uncut, the level of the reference voltage VREF at the output node rises.

The PMOS transistors P8–P10 is constructed with fuse options and the level of the reference voltage VREF at the output node outputted by the NMOS transistors N6–N8 which are turned on or off by the first to the fourth control signals S0–S3 from the fuse multiplexor 122, can be adjusted. If the second control signal S1 becomes a high state, the NMOS transistor N6 turns on to drop the level of the reference voltage VREF at the output node. If the third control signal S2 from the fuse multiplexor 122 becomes a high state, the NMOS transistor N7 turns on to drop the level of the reference voltage VREF at the output node. If the fourth control signal S3 and the first control signal S0 from the fuse multiplexor 122 become low and high states, respectively, the output signal of the NAND gate ND1 becomes a low state. The NMOS transistor N8 turns off to raise the level of the reference voltage VREF at the output node. If the fourth control signal S3 and the first control signal S0 from the fuse multiplexor 122 become high and low states, the output signal of the NAND gate ND1 becomes a high state. The NMOS transistor N8 turns on to maintain the level of the reference voltage VREF at the output node.

Figure 4:
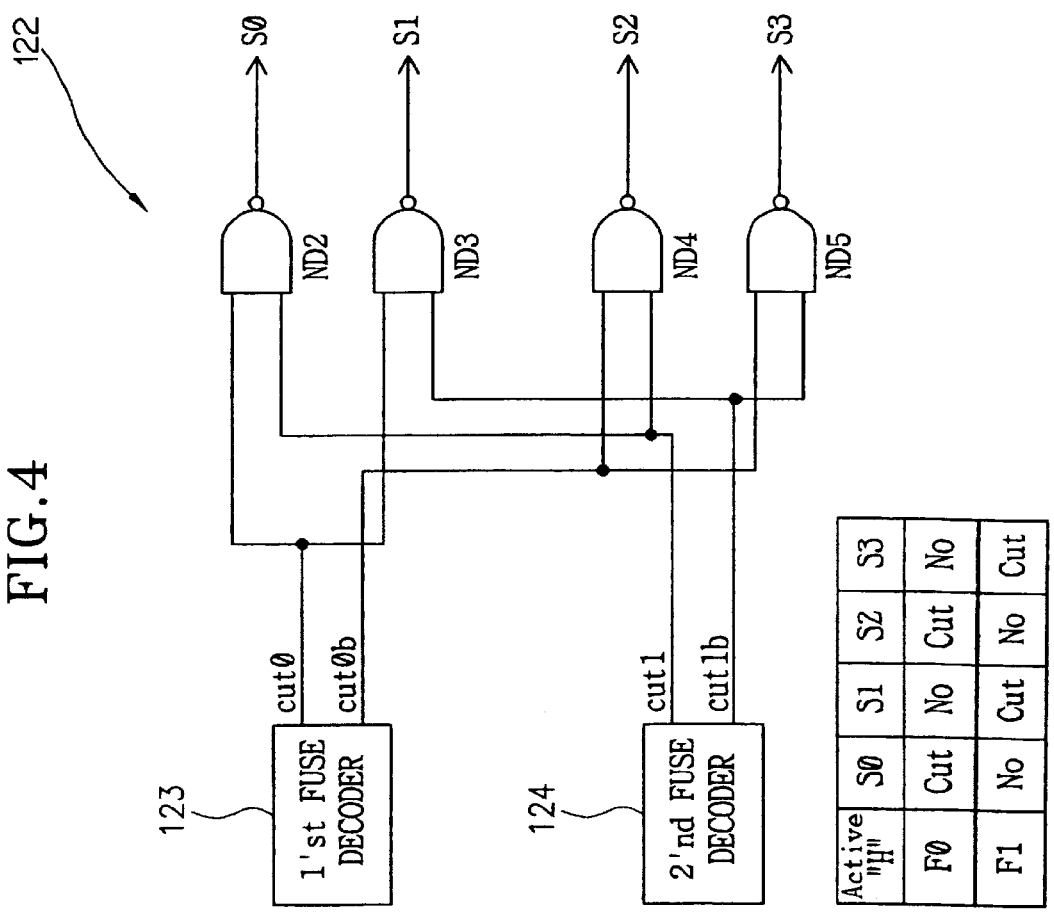
FIG. 4 is a circuit diagram of a fuse multiplexor in a reference voltage adjusting part of the reference voltage generator in FIG. 3.

FIG. 4 is a circuit diagram of the fuse multiplexor 122 in the reference voltage level adjusting part 120 in FIG. 3. The fuse multiplexor 122 includes a first fuse decoder 123 for generating decoded output signals cut0 and cut0b in accordance with a cutting state of a first fuse F1 (not shown) and a second fuse decoder 124 for generating decoded output signals cut1 and cut1b in accordance with a cutting state of a second fuse(not shown).

The fuse multiplexor 122 further includes a NAND gate ND2 for receiving the output signal cut0 of the first fuse decoder 123 and the output signal cut1 of the second fuse decoder 124 to generate the first control signal S0; a NAND gate ND3 for receiving the output signal cut0 of the first fuse decoder 123 and the output signal cut1b of the second fuse decoder 123 to generate the second control signal S1; a NAND gate ND4 for receiving the output signal cut0b of the first fuse decoder 124 and the output signal cut1 of the second fuse decoder 124 to generate the third control signal S2; and a NAND gate ND5 for receiving the output signal cut0b of the first fuse decoder 123 and the output signal cut1b of the second fuse decoder 124 to generate the fourth control signal S3.

Figure 5:
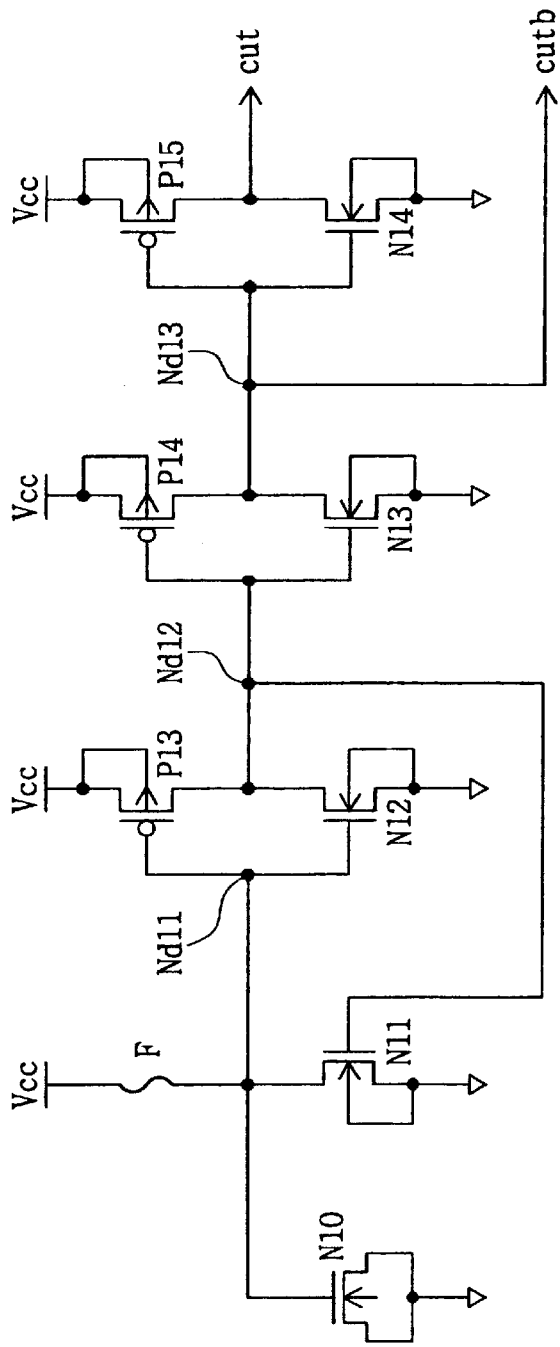
FIG. 5 is a circuit diagram of a fuse decoder in the fuse multiplexor of the reference voltage adjusting part in FIG. 4.

When the fuse F0 of the first fuse decoder 123 which is corresponding to a fuse F in FIG. 5 is cut, the first fuse decoder 123 provides the output signals, i.e. cut0 of high state and cut0b of low state. If the fuse F0 is uncut, it provides the output signals, cut0 of low state and cut1 of high state. Similarly, If the fuse F1 of the second fuse decoder 124 which is corresponding to a fuse F in FIG. 5 is cut, the second fuse decoder 124 provides the output signals, cut1 of high state and cut1b of the low state. If the fuse F1 is uncut, it provides the output signals, cut1 of low state and cut1b of high state. Accordingly, if the first fuse F0 of the first fuse decoder 123 is cut and the second fuse F1 of the second fuse decoder 124 is uncut, the fuse multiplexor 122 outputs the second and third control signals S1 and S2 of low state and the first and fourth control signals S0 and S3 of high state. On the contrary, if the first fuse F0 of the first fuse decoder 123 is uncut and the second fuse F1 of the second fuse decoder 124 is cut, the fuse multiplexor 122 outputs the first and fourth control signals S0 and S3 of low state and the second and third control signals S1 and S2 of high state.

FIG. 5 shows a circuit diagram of the first or second fuse decoder 123 and 124. The first fuse decoder 123 has the same construction and operation as the second fuse decoder 124. The fuse decoder 123 or 124 includes the fuse F0 connected between the power supply terminal Vcc and a node Nd11; a NMOS transistor N10 for a capacitor connected the node Nd11 and the ground terminal Vss; a NMOS transistor N11 which is connected between the node Nd11 and the ground terminal Vss and its gate is connected to a node Nd12; a first inverter which includes a PMOS transistor and a NMOS transistor P13 and N12 which are connected between the power supply terminal Vcc and the ground terminal Vss and their gates are commonly connected to the node Nd11 and provides an output through the node 12.

The fuse decoder 123 or 124 further includes a second inverter which includes a PMOS transistor P14 and a NMOS transistor N13 which are connected between the power supply terminal Vcc and the ground terminal Vss and the output of the first inverter is commonly provided to their gates and provides an output signal cutb, i.e. cut0b or cut1b of FIG. 4 through a node Nd13. The fuse decoder 123 or 124 further includes a third inverter which includes a PMOS transistor P15 and a NMOS transistor N14 which are connected between the power supply terminal Vcc and the ground terminal Vss and the output signal cutb of the second inverter is commonly provided to their gates and provides an output signal cut, i.e. cut0 and cut1 of FIG. 4.

If the fuse F0 is cut, the fuse decoder generates the output signals cut of high state and cutb of low state, respectively. If the fuse F0 is uncut, the fuse decoder generates the output signals cut of low state and cutb of high state, respectively.

Figure 6:
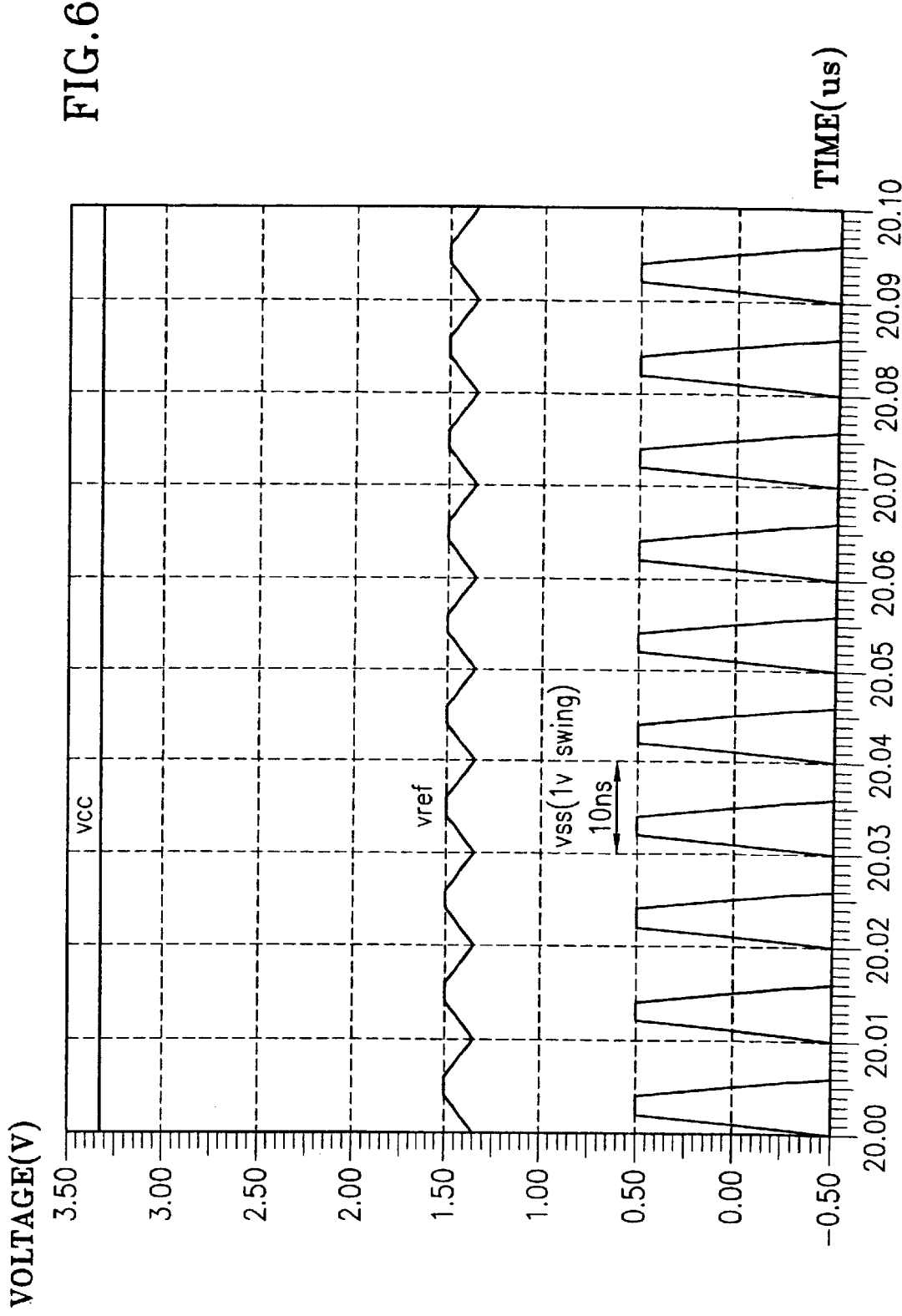
FIG. 6 is a simulation of the noise in the reference voltage generator of the present invention.

FIG. 6 is an output waveform of the reference voltage VREF at the output node. From FIG. 6, it is noted that the noise caused from the ground terminal Vss does not largely affect to the reference voltage VREF at the output node. As compared with the output waveforms of the reference voltages from the reference voltage generators in FIG. 6 and FIG. 2, the immunity to the noise caused from the ground terminal Vss in the reference voltage generator in FIG. 6 can be remarkably improved as compared with that in FIG. 2.

According to the present invention, the reference voltage generator can adjust the level of the reference voltage using the plural metal options and fuse options. Besides the reference voltage generator removes the noise that is caused in the ground terminal to provide the output node for reference voltage by using the low pass filter, thereby improving the noise immunity.

While the invention has been particularly shown and described with respect to preferred embodiment thereof, it will be understood by those skilled in the art that various changes in form and details may be made therein without departing from the spirit and the scope of the invention as defined by the following claims.

What is claimed is:

1. A reference voltage generator comprising:
   a reference voltage generation unit for generating a reference voltage having a potential level by a power-up signal;
   a reference voltage level adjusting unit being connected between an output terminal of the reference voltage generation unit and a first node and for adjusting the potential level of the reference voltage generated from the reference voltage generation unit by a plurality of fuse options; and
   a noise removing unit including a capacitor being connected between the output terminal and the first node and a resistance being connected between the first node and a supply node of ground voltage for preventing flow of noise from the supply node of ground voltage into the output terminal outputting the reference voltage.

2. A reference voltage generator as claimed in claim 1, wherein the capacitor is comprised of a MOS transistor.

3. The reference voltage generator as claimed in claim 2, wherein the MOS transistor for a capacitor is a NMOS transistor.

4. A reference voltage generator as claimed in claim 1, wherein the reference voltage level adjusting means comprises:
   a fuse multiplexor unit for generating a first to a fourth control signals decoded by programming data of fuses;
   a first and a second MOS transistors being connected between the output terminal outputting the reference voltage and a second node in series and controlled respectively by the signal of the first node;
   a first and a second fuses being connected respectively to the first and second MOS transistors in a row;
   a third MOS transistor being connected between the second node and a third node and controlled by the signal of the first node;
   a fourth MOS transistor being connected between the third node and a fourth node and controlled by the signal of the first node;
   a fifth MOS transistor being connected between the fourth node and a fifth node and controlled by the signal of the first node;
   a sixth MOS transistor connected between the fifth node and a sixth node and controlled by the signal of the first node;
   a seventh MOS transistor connected between the sixth node and a seventh node and controlled by the signal of the first node;
   a third and a fourth fuses respectively connected to the sixth and the seventh MOS transistors in a row;
   an eighth MOS transistor connected between the second node and the fourth node and controlled by the first control signal;
   a ninth MOS transistor connected between the third node and the fourth node and controlled by the second control signal;
   a first NAND gate for receiving an inverted signal of the third control signal and the fourth control signal as two inputs; and
   a tenth MOS transistor connected between the fourth node and the fifth node and controlled by an output signal of the first NAND gate.

5. A reference voltage generator as claimed in claim 4, wherein the fuse multiplexor comprises:
   a first fuse decoder unit for generating a first fuse output signal and a first fuse output bar signal by programming data of fuses;
   a second fuse decoder unit for generating a second fuse output signal and a second fuse output bar signal by programming data of fuses;
   a second NAND gate for receiving the first fuse output signal and the second fuse output signal as two inputs and for generating the first control signal;
   a third NAND gate for receiving the first fuse output signal and the second fuse output bar signal as two inputs and for generating the second control signal;
   a fourth NAND gate for receiving the first fuse output bar signal and the second fuse output signal as two inputs and for generating the third control signal; and a fifth NAND gate for receiving the first fuse output bar signal as two inputs and for generating the fourth control signal.

6. A reference voltage generator as claimed in claim 5, wherein the first and second decoder units comprise:

a first or second fuse connected between a power supply terminal and the first node;

a first NMOS transistor for a capacitor connected between the first node and a ground terminal;

a second NMOS transistor which is connected between the first node and the ground terminal and its gate is connected to a second node;

a first inverter including a first PMOS transistor and a third NMOS transistor which are connected between the power supply terminal and the ground terminal and their gates are commonly connected to the first node;

a second inverter including a second PMOS transistor and a fourth NMOS transistor which are connected between the power supply terminal and the ground terminal and their gates are commonly connected to the second node and providing a second or fourth output signal through a third node;

a third inverter including a third PMOS transistor and a fifth NMOS transistor which are connected between the power supply terminal and the ground terminal and their gates are commonly connected to the third node and their gates are connected to the third node and providing a first or third output signal.

7. A reference voltage generator as claimed in claim 4, wherein the first to the seventh MOS transistors are PMOS transistors, respectively.

8. A reference voltage generator as claimed in claim 4, wherein the eighth to the tenth MOS transistors are NMOS transistors, respectively.

* * * * *